United States Patent
Ruchti

(10) Patent No.: US 6,608,568 B1
(45) Date of Patent: Aug. 19, 2003

(54) DEVICE FOR GENERATING A WARNING SIGNAL, ESPECIALLY FOR HELICOPTERS

(75) Inventor: Heinz Gerhard Ruchti, Leurwil (CH)

(73) Assignee: Deep Blue Technology AG, Lehzburg (CH)

( * ) Notice: Subject to any disclaimer, the term of this patent is extended or adjusted under 35 U.S.C. 154(b) by 0 days.

(21) Appl. No.: 09/700,531

(22) PCT Filed: May 17, 1999

(86) PCT No.: PCT/EP99/03398

§ 371 (c)(1),
(2), (4) Date: Jan. 8, 2001

(87) PCT Pub. No.: WO99/59868

PCT Pub. Date: Nov. 25, 1999

(30) Foreign Application Priority Data

May 15, 1998 (DE) ......................................... 198 22 017

(51) Int. Cl.$^7$ .............................................. G08B 21/00
(52) U.S. Cl. ........................ 340/946; 340/963; 340/980; 73/178 H; 244/17.11; 701/14
(58) Field of Search ................................ 340/963, 946, 340/965, 980; 244/17.11; 701/3, 8, 9, 14; 73/178 H

(56) References Cited

U.S. PATENT DOCUMENTS

| | | | | | |
|---|---|---|---|---|---|
| 4,115,755 A | * | 9/1978 | Cotton | ...................... | 73/178 H |
| 4,550,984 A | * | 11/1985 | Reymond | ...................... | 33/262 |
| 4,742,352 A | * | 5/1988 | Ishii | ...................... | 340/825.47 |
| 4,870,412 A | * | 9/1989 | Vuichard | ...................... | 340/946 |
| 5,072,209 A | * | 12/1991 | Hori et al. | ...................... | 340/432 |
| 5,339,244 A | * | 8/1994 | Stiles, Jr. et al. | ............ | 340/945 |
| 5,440,301 A | * | 8/1995 | Evans | ...................... | 340/521 |
| 5,495,427 A | * | 2/1996 | Puma et al. | ........... | 340/870.41 |
| 5,594,416 A | * | 1/1997 | Gerhaher | ...................... | 340/467 |
| 5,596,332 A | * | 1/1997 | Coles et al. | ................ | 342/455 |
| 6,016,103 A | * | 1/2000 | Leavitt | ........................ | 350/575 |
| 6,020,814 A | * | 2/2000 | Robert | ........................ | 340/467 |

* cited by examiner

Primary Examiner—Brent A. Swarthout
(74) Attorney, Agent, or Firm—McKee, Voorhees & Sease, P.L.C.

(57) ABSTRACT

The present invention relates to a warning device for indicating dangerous circumstances, especially for helicopters, having a signal receiving means for receiving and processing an operational status signal; a signal comparison means which compares the received operational status signal against predefined criterion; a monitoring signal generating means which generates a monitoring signal when the operational status signal meets said criterion; a monitoring transmission signal transmitting means which wirelessly emits said generated monitoring signal; a monitoring transmission signal receiving means which receives said emitted monitoring signal; a monitoring transmission signal comparison means which analyzes whether said received monitoring transmission signal meets predefined monitoring transmission signal criteria; and an output means which emits an output signal when the monitoring transmission signal meets said criteria, whereby said receiving means, said monitoring transmission signal comparison means and said output means are worn by a user and said output signal is immediately perceived by the user.

35 Claims, 4 Drawing Sheets

| Preamble | Address signal | Data | Postamble |
|---|---|---|---|
| 16 BIT | 24 BIT | 32 BIT | 4 BIT |

Fig. 5

| Preamble | Address change signal | Address comparison signal | Postamble |
|---|---|---|---|
| 16 BIT | 24 BIT | 24 BIT | 4 BIT |

Fig. 6

DEVICE FOR GENERATING A WARNING SIGNAL, ESPECIALLY FOR HELICOPTERS

BACKGROUND OF THE INVENTION

The present invention relates to a method and a device for the generating of a warning signal, especially for helicopter pilots.

The present invention will be described in the following primarily using the exclusive example of generating a warning signal for helicopter pilots.

It is however to be pointed out that this description on the use of the present invention in no way restricts its use in other similar areas, but rather that it is also possible to make use of the present invention in conjunction with other technical devices and configurations, such as for example other aircraft and flight devices in general, as well as motor vehicles, trucks, and also when operating and monitoring such machines, plants and systems in which an operator needs to be immediately and reliably alerted about a dangerous situation which can arise suddenly.

The powering of a helicopter usually transpires with an internal combustion engine, for example a turbine, its output coupled to the rotor blades via a transmission.

Since rotor drive failure must be avoided at all costs, it is necessary to constantly monitor the operating status of an internal combustion engine (turbine) and transmission. The pilot must hereby pay particular attention to ensuring that the turbine's running temperature does not exceed a predefined critical limit and furthermore that neither does transmission torque exceed a predefined critical limit.

Even just a slight overloading of the transmission, meaning for example exceeding the maximum permissible torque by 10 to 15%, necessitates a costly overhaul of the transmission.

In large helicopters, the pilot's collective pitch lever, referred to as control stick in the following, is outfitted with a device, as is also customary for example with the control yoke in commercial airliners, which serves to alert the pilot to dangerous circumstances. Said device induces the control stick to initially vibrate slightly when the pilot is approaching a dangerous condition, and then to shake more strongly upon reaching an inadmissible state.

Such vibration mechanisms however are very costly which prohibits their use, especially in smaller flight devices. In addition, they require a considerable amount of space and are themselves subject to extremely strict safety requirements since a vibration mechanism must never induce a faulty functioning of the control stick.

It is the task of the present invention to provide a method and a device for the generating of a warning signal, especially for helicopter pilots, which can be easily and inexpensively installed or integrated in a helicopter, an airplane, a motor vehicle or any system to be monitored, and which is furthermore suitable for being retrofitted.

SUMMARY OF THE INVENTION

This task is solved in accordance with the present invention by a device according to claim 1.

Preferred embodiments of the invention constitute the subject matter of the subclaims.

The present invention has considerable advantages compared to known warning systems.

Electrical sensors are employed to detect parameters to be monitored, such as for example, operating temperature and transmission torque. The output signals from these sensors serve as comparative signals. In many cases, there may even be a status alarm signal already provided in measurement processing systems of the corresponding mechanism; e.g., the helicopter. This then further reduces efforts expended in signal detection and processing. Utilizing existing sensors enables particularly simple and economical retrofitting of existing helicopters and similar contrivances.

A relatively compact small electronic device is required for the processing and emitting of such signals. It must be able to be accommodated easily into smaller aircraft, etc., Similarly, the receiving device can also be configured as a small compact device to be worn by the pilot and which remains in constant contact with the transmitting device by means of a wireless connection.

This system provides for an overall company warning device which in no way affects the operation of the associated mechanism, but which is able to indicate a dangerous situation in a very reliable manner.

Compared to control stick vibration devices, the investment expenditure is considerably less.

Since the warning device has no mechanical connection to the control stick nor to any other component of the airplane, there is no danger of the device adversely affecting any of the functions.

According to a preferred embodiment, the warning device is worn on the wrist like a wristwatch. Signaling preferably ensues by having the device vibrate when a state of alarm is detected, thus alerting the pilot of the dangerous situation. Alternatively, other mechanisms may also be used to indicate alarm status, for example, heating up to a certain temperature limit which is physiologically not harmful to the skin, the emitting of a small, physiologically harmless electrical pulse, etc.

A configuration of this type has numerous advantages.

During the course of performing his duties, a helicopter pilot is often visually and/or acoustically distracted to a great degree. For example, a pilot who is maneuvering a complicated take off or landing in tight quarters has no time to simultaneously pay close attention to his instrumentation. The same applies when, for example, the pilot of a transport helicopter has to set down loads such as, for example, columns for power lines, ski-lifts and the like, maneuvers which require absolute pinpoint accuracy. Although transport helicopters have, for example, their own indicator instruments for turbine temperature and gear torque located outside of the helicopter so that pilots looking downward can still monitor their instruments, this type of additional instrumentation is not only very expensive, it can also interfere with: the pilot's field of vision while performing such tasks.

The warning device according to the present invention ensures that the pilot continues to be kept informed even when he is deeply concentrated on other tasks.

A warning device of the inventive type is superior to audible warning devices such as, for example, a horn or the like. Especially while performing difficult tasks, a pilot is acoustically distracted by conversations with the control tower or with members of his respective work team or rescue troop and may therefore, not always perceive such a signal.

A device with a vibration mechanism or a similar warning mechanism does not require any attention on the part of the pilot, nor does it distract him from fulfilling his relevant duties. The pilot can, therefore, fully concentrate on the actual task at hand.

Apart from these considerations, there is however an embodiment of the present invention which also involves a visual signal.

In said embodiment of the invention, the receiver, or at least an optical display means coupled to the receiver, is integrated into a pair of glasses, for example sunglasses. This display means is well-suited to keeping the pilot informed of dangerous situations or of his measurement readings without the need for additional instruments and without narrowing his field of vision.

In a first embodiment, the glasses are configured such that one or two warning lights, preferably LEDs or the like, are activated in a dangerous situation. In such a state of alarm, the pilot will then see, for example, corresponding red warning lights lighting up on the upper frame of his glasses, thus becoming alerted to dangerous circumstances. Such a device is a very reliable warning device since the glasses are of course always within the pilot's field of vision and hence it is also possible to warn a pilot even when he is not looking directly at his instruments. Furthermore, the lighting up of a warning light in the glasses is a very clear visible signal that will not be overlooked by the pilot even during dangerous situations. In order to increase its visibility, the signal can also be made to flash.

Besides having just a warning function, an instrument configured in this way can also assume other functions. Hence, it is particularly possible to alert the pilot not only to the actual danger itself, but also to an impending danger.

When employing a warning light, the light can start to flash at a slow rate when, for example, a pilot comes within a certain percentage of a critical value; e.g., 10% or 20%. He is thus made aware of approaching a dangerous situation. The closer the corresponding reading comes to the critical threshold limit, the higher the flash frequency will be, so that by noting the frequency of the flashes, the pilot flying the helicopter remains informed about his permissible range while also simultaneously concentrating on other duties.

Instead of using a flash frequency, other measures are also possible. For example, a color display can be utilized which for instance gradually changes from green to red to show the approaching of dangerous status. It is furthermore possible to indicate an impending dangerous condition by, for example, a variable number of activated light sources. A first lighted or flashing LED would thus indicate the approaching of dangerous status and the closer the aircraft continues to near said dangerous situation, the more LEDs are switched on up to a maximum of, for example, five LEDs.

As previously cited, it is preferred to utilize LEDs, LCDs or other such similar indicators for the display.

In a further variation of this embodiment, the receiver and the alarm output means are arranged in the housing of a wristwatch. Upon the outputting of an alarm, the contacts which are disposed on the underside of the housing and which are in contact with the user's skin, emit small harmless electrical pulses that are registered by the user.

DESCRIPTION OF THE SEVERAL VIEWS OF THE DRAWINGS

Further advantages, features and application possibilities of the present invention will now be specified in the following description of an embodiment in conjunction with the figures, which show:

FIG. 5 a schematic representation of the configuration of the transmission signal during normal operation in the embodiment according to FIG. 1;

FIG. 6 a schematic representation of the configuration of the transmission signal during address change mode in the embodiment according to FIG. 1;

DETAILED DESCRIPTION OF THE INVENTION

The first embodiment of the invention explained with reference to FIGS. 1 to 7 is designed for monitoring transmission torque in a helicopter and emitting a warning signal when the gear torque reaches a critical value. However, wherever applicable, same can also be used to monitor turbine temperature in a helicopter or for other technical devices and configurations, such as airplanes and flight devices in general, or in motor vehicles, trucks, machines and other kinds of systems.

Figure 1:
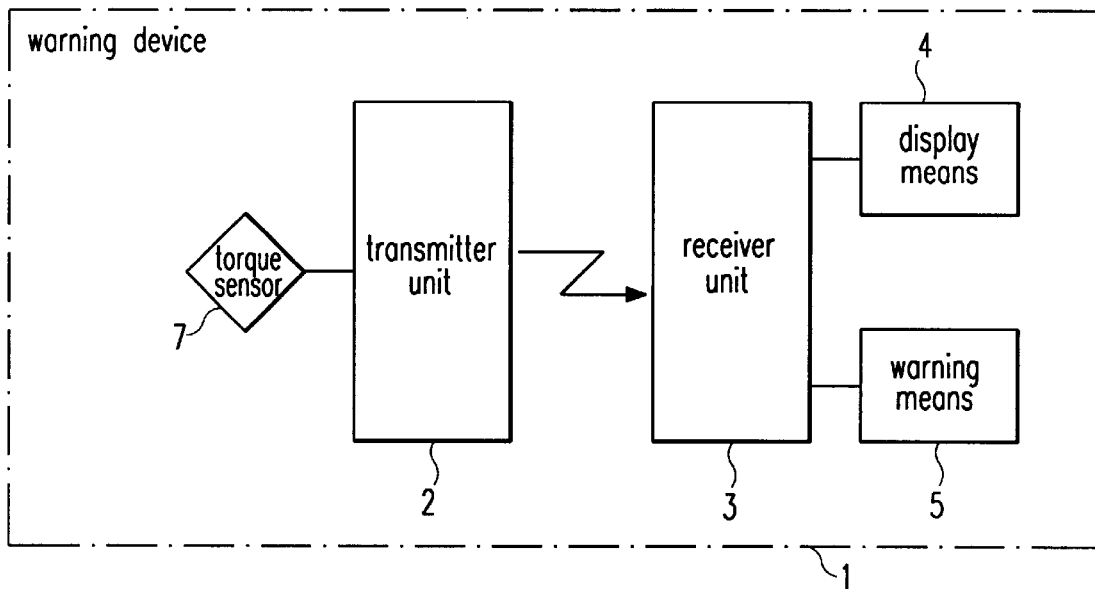
FIG. 1 a schematic functional representation of a warning device in an embodiment of said warning device according to the present invention.

FIG. 1 shows a highly schematic representation of the warning device, which is indicated as a whole by reference numeral 1, and having a transmitter unit 2 comprising the transmitting device and a receiver unit 3 comprising the receiving device.

In the present example, transmitter unit 2 is fixedly mounted in the helicopter's cockpit (not shown in the figures).

A torque sensor 7 is arranged on the transmission to record gear torque.

During operation, receiver unit 3 is employed while at spatial distance from transmitter unit 2 and is coupled to display means 4 and warning means 5, both customarily incorporated directly into the housing of the receiver unit.

Figure 2:
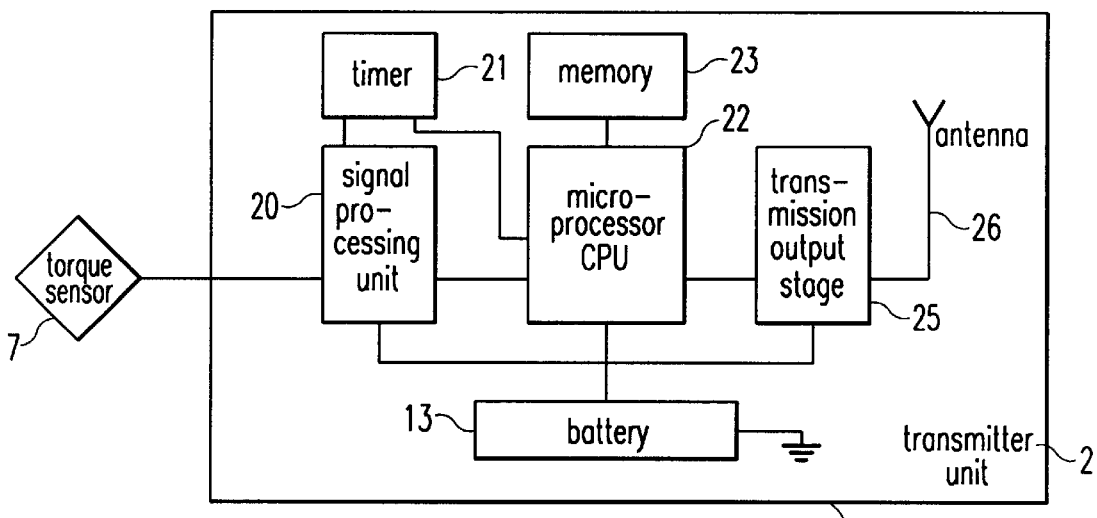
FIG. 2 a schematic representation of the transmitter unit of the embodiment according to FIG. 1.

The schematically represented transmitter unit 2 in FIG. 2 has a housing 10 in which the electrical and electronic components of the transmitter unit are arranged.

Housing 10 additionally accommodates a battery 13 which supplies electrical power to the receiver unit. In an embodiment not represented herein, the transmitter unit is supplied with electrical power from the helicopter's power supply means.

The configuration of the transmitter unit's electrical components will now be described with reference to FIG. 2.

Torque sensor 7 is connected with a signal processing circuit 20 via electrical conduit (here and in the following always depicted only schematically). All types of sensors as commercially available may be readily used as a torque sensor.

The torque sensor's analog signal is converted into a digital signal by an A/D converter in signal processing circuit 20. Signal processing circuit 20 is further connected to a quartz-driven timer 21, the purpose thereof to be explained in the following. The digitally processed signal is fed to a conventional microprocessor CPU 22.

Microprocessor CPU 22 is linked to a memory 23 and likewise receives the signals of timer 31. Memory 23 (and the corresponding memory in the receiver unit) can be rendered wholly of RAM memory elements. It is however also possible to make use of a mixed memory consisting of ROM (constant memory) and RAM memory elements. Since a stable continuous voltage is provided by the battery, the contents of the memory are saved long-term, even when working with volatile memory elements.

Microprocessor 22 converts the load signal as well as any other signals to be transmitted into a transmission signal according to a program stored in memory 23 and feeds same to a transmission output stage 25. From transmission output stage 25, the signal is transmitted to antenna 26 which is made of a ferrite core wound in copper wire.

Figure 3:
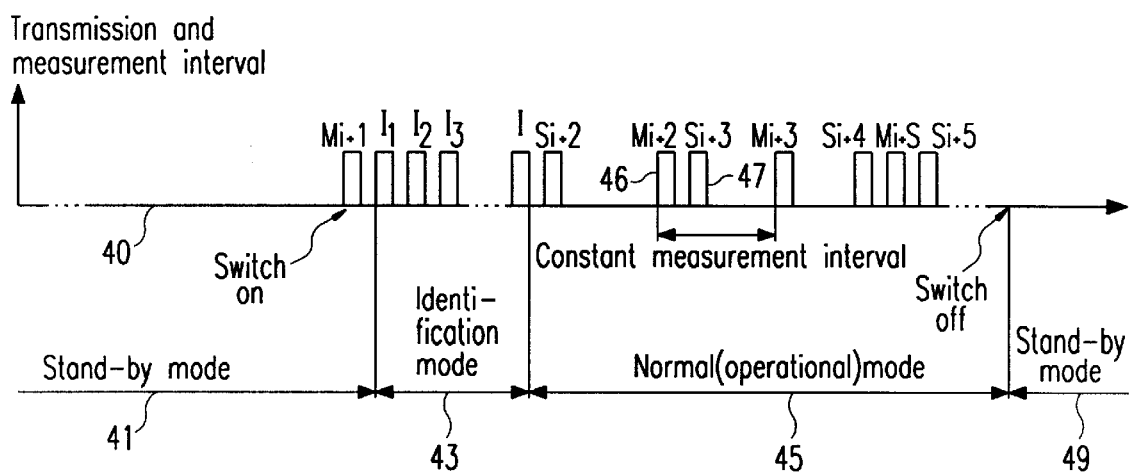
FIG. 3 a schematic representation of the functional modes of the transmitter unit of the embodiment according to FIG. 1.

Different methods for operating the transmitting device will now be described with reference to FIG. 3 in which the various functional modes of the transmitter unit are plotted across time axis 40.

In the time segment 41 shown on the left side of the figure, the transmitting device is in, stand-by mode.

When the helicopter is first started, the transmitting device switches from stand-by mode to transmitting mode. Right after being switched on, a so-called address change mode or pairing mode initially ensues in time segment 43; this will be clarified at a later point.

The actual normal mode of time segment 45, which represents the actual operational phase of the shown device, follows the address change mode. As is schematically depicted in FIG. 3, this mode alternates between a measurement interval 46 and a transmission interval 47. After each measurement value has been received, the microprocessor then generates the transmission signal and conveys same to antenna 26 via transmission output stage 25.

The signal to start the torque measurement is given by timer 21 of the transmitting device. Microprocessor 22 is thereupon activated and the torque is measured via torque sensor 7.

The interval of time transpiring between the measuring of the torque and the emitting of the signal is not constant, but rather varied by the microprocessor within a predefined range of time according to a random process.

Emitting of the signal however always transpires before the receipt of the next measured value. This temporal variation has the advantage that in the instance of two warning devices which are simultaneously monitoring different helicopters at a close distance to one another, emitted signal values will only collide randomly.

If the time span between the measurement interval and transmission interval was always the same, this could lead to an unfortunate arrangement wherein the values emitted by two transmitter units would collide with one another over a longer period of time.

As soon as the helicopter is switched off, the transmitter unit switches back to stand-by mode, as shown in time segment 49.

The transmission of the signal from transmitter unit 2 to receiving unit 3 ensues via electromagnetic radio wave at constant frequency. A standard quartz-driven timer 21 serves to control the transmission frequency.

The data signals to be transmitted are digitally encoded in transmitter unit 2 in order to lessen susceptibility to interference for the data transmission. There are various methods known in the prior art for transmitting digital data in which the carrier frequency, amplitude or phasing can be modified.

A known method which can also be employed for a warning device of the type as depicted here is changing of the transmission signal frequency utilizing the so-called "frequency shift keying" process. In this method, the "0" and "1" bit information data are allocated different frequencies which, however, means that two frequencies must be transmitted, increasing the efforts expended at both transmission and receiving ends.

The best transmission prospect has proven to be the manipulating of the phasing making use of the so-called "phase shift keying" (PSK). In the present embodiment, another particular variation of the PSK method is employed, namely a "differential phase shift keying" (DPSK).

In this method, the transmission signal undergoes a phase jump upon a "1" being transmitted; upon a "0" being transmitted, the transmission signal remains unchanged. As the first bit of the transmitted binary pattern in this method contains an uncertainty, it cannot serve as a carrier of information.

Figure 4:
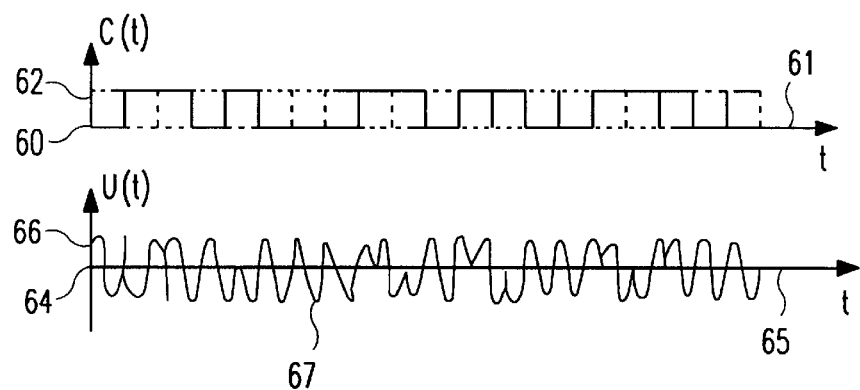
FIG. 4 a schematic representation of the coding of the transmissions signal of the embodiment according to FIG. 1.

An example of this digital encoding is represented in FIG. 4. Diagram 60 depicts a binary pattern constituting the bits 011010011 . . . plotted across a time axis 61 and a numerical axis 62.

In diagram 64, a voltage signal 67 is plotted across the same scaled time axis 65 and a voltage axis 66, which exhibits a constant frequency, however in which the binary pattern is cast as phase shift by means of the afore-described DPSK modulation.

It is evident from FIG. 5 that a sequence of signals is emitted within each transmission interval, said sequence comprised of a preamble, the address signal, a data block and a postamble.

The preamble serves to enable synchronization of the receiver device to the signal sent. The address signal contains the specific transmitter identification, followed by the actual data block to be transmitted. The block of data in all cases contains the measured torque but, in a preferred embodiment, it can certainly also include a temperature value, to be detected by a corresponding temperature sensor.

Of course other data can also be transmitted as well, when same would be of interest for specific applications. Finally the postamble follows, serving among other things as an error corrector.

In the embodiment as represented, the synchronization interval comprises 16 bits, the address signal is of 24 bits, the data block is 32 bits, and the postamble is 4 bits, resulting in the signal being 76 bits long in total.

Figure 7:
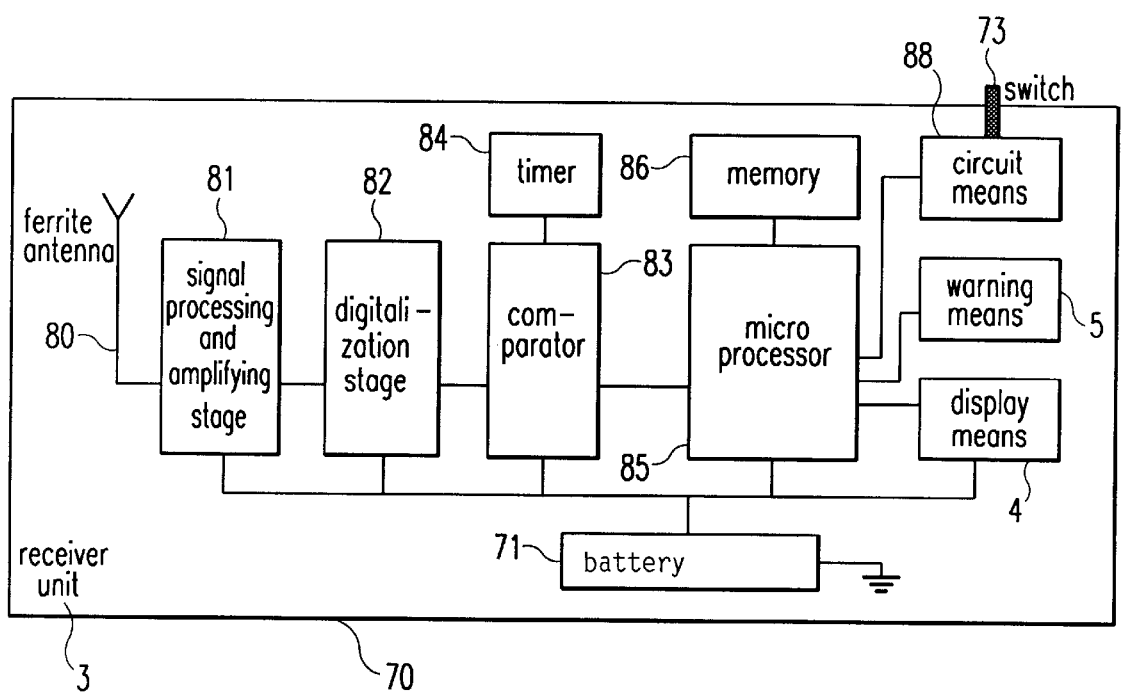
FIG. 7 a schematic representation of the receiver unit of the embodiment according to FIG. 1.

The configuration of the receiver unit will now be described with reference to FIG. 7.

Receiver unit 3, being separate from the transmitter unit, is accommodated in a housing 70 and has no physical connection whatsoever to transmitter unit 2, be it in mechanical fashion or via electrical conduits. Housing 70 contains a battery 71 in order to provide power to the electrical and electronic components.

A flexible strap (not shown) is furthermore disposed on housing 70, enabling the user to fasten the receiver unit at his wrist like a wristwatch.

In order to start operation of the device and to confirm the allocation in the pairing mode, a acknowledgement switch 73 is recessed into the housing so that the user can actuate said switch, for example, with a finger. Under certain circumstances, this action is then interpreted by the receiver unit as a switch event.

The receiver unit also has a ferrite antenna 80, as represented schematically in the figure. The received signal is initially fed to a signal processing and amplifying stage 81, followed by a digitalization stage 82. Both of these components correspond to the conventional design.

The digital signal is fed to a comparator 83 which determines whether the received and processed signal contains the address signal or the address control signal. Should this be the case, the signal is fed to microprocessor 85, which is controlled by a program stored in memory 86 and which takes over the subsequent processing.

The advantage of utilizing the upstream comparison stage is that microprocessor 85 is only fed the signal after it has first been established that the specific receiving device has been addressed.

Timer 84 controls the timing for the receiver unit.

The data derived from the received signal as well as any additional data as possibly required is shown to the user on display 87. Display 87 is arranged behind a transparent section of the wall of receiver unit 2 housing 70. The display shows the currently prevailing transmission torque and, if required, turbine temperature as well.

The respective data remains visible on the display until a new measurement is carried out and a transmission of the values establishes new data.

The receiving device furthermore comprises a circuit means 88 (shown here only in schematic representation) having the previously mentioned switch 73.

The actual process of the allocating or the pairing of the transmitter unit and the receiver unit during the address change mode will now be described in the following.

As previously stated, each transmitter unit is assigned its own unique address signal during manufacture, one which is commissioned only once. A 24 bit signal is utilized in the present embodiment, which yields a total of 16.7 million different addressing possibilities. This high number ensures that no two transmitter units will ever have the same identical signal.

The address signal of the transmitter unit is filed in a constant memory area of memory 23 of transmitter unit 2. It is also possible to store the address signal in a RAM memory area; however, in this case the signal must additionally be otherwise locatable in the device, e.g. by a concurrent utilization of its manufacturer number or the like so that the signal can be read correctly again following a battery replacement.

The address change mode is started each time the transmitter unit put into operation. As previously explained, this transpires preferably by means of a predefined stipulated activation criterion, for example the starting of the helicopter. The transmitter unit then changes to address change mode and sends a signal, as represented in FIG. 6, which is comprised of a preamble, an address control signal, the actual address signal and a postamble. In the embodiment shown, the preamble is 16 bits long, the postamble is 4 bits long, an d both the address control signal as well as the actual address signal are each 24 bits long.

The address control signal is recognized by all receiver units of the corresponding series. As soon as a receiver unit receives this signal, the microprocessor induces a switching over to address change mode. The processor then queries on the display whether the address signal of the transmitter unit is to be accepted. Following actuation of switch 73 of circuit means 88, thus confirming said acceptance to the processor, the address signal of the transmitter unit is appropriated and saved as the address comparison signal in memory 86.

The control program of the receiver unit stored in memory 86 can be configured such that the receiver unit, as soon as it receives the transmitter unit's address control signal in address change mode, analyzes whether the address comparison signal it has on file concurs with the transmitter unit's address signal. Should this be the case, the receiver unit can then show that it is set to said transmitter unit so that the user knows the two devices are allocated to one another.

In order to prevent an inadvertent allocation of devices, the address change mode of the embodiment comprises several security steps.

The first security step is the coupling of the beginning of the address change mode with the transmitter unit activation criterion. Address change will only ever ensue as a direct result of occurrence of the activation criterion, thus reliably preventing that an address change will start during the normal operation of the device.

At a second security step, a corresponding device in the receiver unit performs a measurement of the energy of the signal received in address change mode. The receiver unit's program is configured such that whenever an address control signal is received, an energy measurement of the aggregate signal is carried out. An allocation is then only possible when the transmission energy exceeds a certain limit.

As is known, transmission of energy from transmitter to receiver unit is contingent upon distance and, to a considerable degree, also upon the respective alignment of both antennas to one another. Only when the devices are arranged in a certain manner to one another with respect to spatial and angle contingencies will the energy received by the receiver unit be at a maximum high. The critical threshold value for the energy measurement is thus to be selected such that an allocation may only transpire when the transmitter unit and the receiver unit are not only arranged at a short distance from one another, but are also align ed at a predetermined angle from one another.

In order to facilitate the angle-contingent allocation, the antennas of the transmitter unit and the receiver unit are preferably arranged in their respective housings such that maximum energy is yielded upon a parallel or T-shaped arrangement of the devices to one another.

In order to also exclude fortuity at this stage as well, the emitting of the address control signal is repeated several times, but does not proceed to sufficient signal energy until the measured value of a specific proportional percentage of the transmission registers above the critical limit.

Finally, and this represents the next security step, the user is still required to confirm the address change by actuating circuit means 88.

An allocation thus transpires only when:

1. receiver unit and transmitter unit are basically arranged directly adjacent one another at a defined angle;
2. the helicopter is started while in this state, and
3. the identification is manually activated b the user.

Contingent upon the measured torque, microprocessor 85 feeds a signal, to the warning device.

In the preferred embodiment as represented, warning means 5 is firmly connected to the housing of receiver unit 70. Beginning at a predefined first torque limit, processor 85 feeds a signal to warning means 5, said signal becoming stronger as the measured torque becomes greater.

Correlated to the magnitude of the signal which warning means 5 receives from processor 85, warning means 5 generates vibrations which are transmitted to housing 70 of the receiver unit and consequently to the arm of the user. The user will also register the receiver unit vibrations on his wrist even if he is distracted with other sensory input such as conversations with the tower or other difficult tasks. Hence, the user receives a reliable warning of transmission overload.

REFERENCE NUMERAL LIST

1 Warning device
2 Transmitter unit
3 Receiver unit
4 Display means
5 Warning means
7 Torque sensor
10 Housing
13 Battery
20 Signal processing circuit
21 Transmitting device timer
22 Microprocessor CPU
23 Memory
25 Transmission output stage
26 Antenna
40 Time axis
41 Time segment
43 Time segment
45 Time segment
46 Measurement interval
47 Transmission interval
49 Time segment
60 Diagram
61 Time axis
62 Numerical axis
64 Diagram
65 Time axis
66 Voltage axis
67 Voltage signal
70 Receiver unit housing
71 Battery
73 Switch
80 Ferrite antenna
81 Signal processing and amplifying stage
82 Digitalizing stage
83 Comparator
84 Timer
85 Microprocessor
86 Memory

What is claimed is:

1. Warning device for indicating dangerous circumstances, especially for helicopters, having:
   a transmitter for receiving and processing an operational status signal;
   a signal comparison means which compares the received operational status signal against predefined criterion;
   a signal generating means which generates a monitoring signal when said operational status signal meets said criterion and an address signal uniquely identifying said transmitter;
   a signal transmitting means which wirelessly emits an emitted signal comprising said generated monitoring signal and said address signal;
   a signal receiving means which receives said emitted signal;
   a receiver comparison means which analyzes whether said received monitoring signal meets predefined monitoring signal criteria;
   an output means which emits an output signal when said monitoring signal meets said criteria;
   whereby said receiving means, said receiver comparison means and said output means are worn by a user and said output signal is immediately perceived by the user;
   said output means further comprising a memory storing an address comparison signal and an address comparison means which analyses whether the received address signal concurs with the address comparison signal stored in memory;
   at least one of said address signal and said address comparison signal being variable;
   signal changing means capable of changing said one of said address signal and said address comparison signal to make said address signal and said address comparison signal identical to one another;
   said output means only emitting said output signal when the address signal received by said output means and the address comparison signal stored in the memory are identical.

2. Warning device for indicating dangerous circumstances according to claim 1, characterized in that
   said output means comprises a display means for displaying the operational status.

3. Warning device for indicating dangerous circumstances according to claim 1, characterized in that
   a conversion means is provided which digitally codes the emitted signal to be transmitted by said signal transmitting means.

4. Warning device for indicating dangerous circumstances according to claim 1, characterized in that
   at least said signal generating means of said signal transmitting means comprises a first microprocessor means which is controlled by a program filed in a memory.

5. Warning device for indicating dangerous circumstances according to claim 1, characterized in that
   said output means comprises a microprocessor unit which is controlled by a program stored in the memory allocated to said output means.

6. Warning device for indicating dangerous circumstances according to claim 1, characterized in that
   said address signal is stored in the signal transmitting means as a digital sequence of numbers having n bits and that the address comparison signal is likewise stored in the memory as a digital sequence of numbers having n bits.

7. Warning device for indicating dangerous circumstances according to claim 1, characterized in that
   the signal generating means of said signal transmitting means generates an address control signal; that an address control comparison signal is stored in the memory of the output means; and that the receiver comparison means switches said output means to an address signal change mode as soon as the comparison means recognizes that an address control signal emitted by the monitoring transmission signal transmitting means is identical to the address control comparison signal stored in the output means.

8. Warning device for indicating dangerous circumstances according to claim 7, characterized in that
   said signal transmitting means comprises a first detection means which recognizes the occurrence of a predefined criterion and induces the switching of the signal transmitting means to an address change mode in which an address control signal and the address signal are emitted.

9. Warning device for indicating dangerous circumstances according to claim 1, characterized in that
   said output means comprises a received energy measurement means which measures the energy of the emitted signal received by the signal receiving means at least upon instance of the signal comparison means establishing that said address signal transmitted by the signal transmitting means is identical with the address control comparison signal stored in the output means.

10. Warning device for indicating dangerous circumstances according to claim 1, characterized in that said signal changing means comprises a manually actuatable circuit means and that said address signal received during address change mode will only be filed in the output means when said manually actuatable circuit means is activated.

11. Warning device for indicating dangerous circumstances according to claim 1, characterized in that said signal changing means only changes said one of said address signal and said address comparison signal when the energy of the received signal is above a predetermined defined value and when said circuit means is activated.

12. Warning device for indicating dangerous circumstances according to claim 1, characterized in that transmission of the emitted signal from the signal transmitting means to signal receiving means transpires by means of ultrasound.

13. Warning device for indicating dangerous circumstances according to claim 1, characterized in that transmission of the emitted signal from the signal transmitting means to the signal receiving means transpires by means of electromagnetic waves.

14. Warning device for indicating dangerous circumstances according to claim 12, characterized in that transmission of the emitted signal transpires via the change in phasing of a sinusoidal wave (phase shift keying).

15. Warning device for indicating dangerous circumstances according to claim 1, characterized in that said signal transmitting means comprises a timer unit and measures status at predefined set intervals of time.

16. Warning device for indicating dangerous circumstances according to claim 15, characterized in that the status determined during a measurement is converted into a signal and transmitted prior to the next measurement being performed and that a programmed intelligent sequence is provided which effects that the temporal interval between measurement and transmission of measured signals is not constant.

17. Warning device for indicating dangerous circumstances according to claim 1, characterized in that said warning device monitors at least one of the critical operating parameters of the system to be monitored.

18. Warning device for indicating dangerous circumstances according to claim 1, characterized in that a warning signal is triggered in the event that one of said critical operating parameters monitored exceeds a predetermined threshold.

19. Warning device for indicating dangerous circumstances according claim 18, characterized in that the intensity of said warning signal is contingent upon the exceeding of said threshold.

20. Warning device for indicating dangerous circumstances according to claim 17, characterized in that the decisive torque parameter respective transmission overload is defined and monitored.

21. Warning device for indicating dangerous circumstances according to claim 17, characterized in that the decisive temperature parameter respective turbine overload is defined and monitored.

22. Warning device for indicating dangerous circumstances according to claim 18, characterized in that said output means generates vibration upon the generating of said warning signal.

23. Warning device for indicating dangerous circumstances according to claim 18, characterized in that said output means generates a physiologically harmless electric pulse upon the emitting of said warning signal.

24. Warning device for indicating dangerous circumstances according to claim 18, characterized in that said output means generates a physiologically tolerable amount of heat for being perceived by the user upon the emitting of said warning signal.

25. Warning device for indicating dangerous circumstances according to claim 1, characterized in that said output means emits a warning signal by means of activating warning lights.

26. Warning device for indicating dangerous circumstances according to claim 25, characterized in that several warning lights are provided and that the number of warning lights which are lighted is a measure of an operational parameter approaching a dangerous state.

27. Warning device for indicating dangerous circumstances according to claim 1, characterized in that said signal receiving means, said receiver signal comparison means and said output means are arranged within one housing.

28. Warning device for indicating dangerous circumstances according to claim 27, characterized in that said housing with said monitoring transmission signal receiver unit of the warning device is capable of being worn at the user's wrist by means of a strap.

29. Warning device for indicating dangerous circumstances according to claim 28, characterized in that said monitoring transmission signal receiving means and said output means are integrated in one wristwatch.

30. Warning device for indicating dangerous circumstances according to claim 1, characterized in that said signal receiving means and said output means are arranged on the frame of a pair of glasses.

31. Warning device for indicating dangerous circumstances according to claim 1, characterized in that said warning device monitors the critical operational parameters of a helicopter.

32. Warning device for indicating dangerous circumstances according to claim 1, characterized in that said warning device monitors the critical operational parameters of an aircraft.

33. Warning device for indicating dangerous circumstances according to claim 1, characterized in that said warning device monitors the critical operational parameters of a motor vehicle.

34. Warning device for indicating dangerous circumstances according to claim 12, characterized in that transmission of the emitted signal transpires via a differential change in phasing (differential phase shift keying).

35. Warning device for indicating dangerous circumstances according to claim 13, characterized in that transmission of the emitted signal from the signal transmitting means to the signal receiving means transpires by means of radio waves.

* * * * *

UNITED STATES PATENT AND TRADEMARK OFFICE
CERTIFICATE OF CORRECTION

PATENT NO. : 6,608,568 B1  Page 1 of 1
DATED : August 19, 2003
INVENTOR(S) : Heinz Gerhard Ruchti It is certified that error appears in the above-identified patent and that said Letters Patent is hereby corrected as shown below:

<u>Title page,</u>
Item [75], Inventors, "Leurwil" should be -- Leutwil --
Item [73], Assignee, "Lehzburg" should be -- Lenzburg --

Signed and Sealed this

Twenty-seventh Day of January, 2004

JON W. DUDAS
*Acting Director of the United States Patent and Trademark Office*